July 7, 1953        B. LEMANSKI        2,644,291

ADJUSTABLE CONVEYER FOR HARVESTER PICKUPS

Filed Aug. 17, 1950        2 Sheets-Sheet 1

INVENTOR.
BERNARD LEMANSKI.
BY
Robert A. Sloman
ATTORNEY.

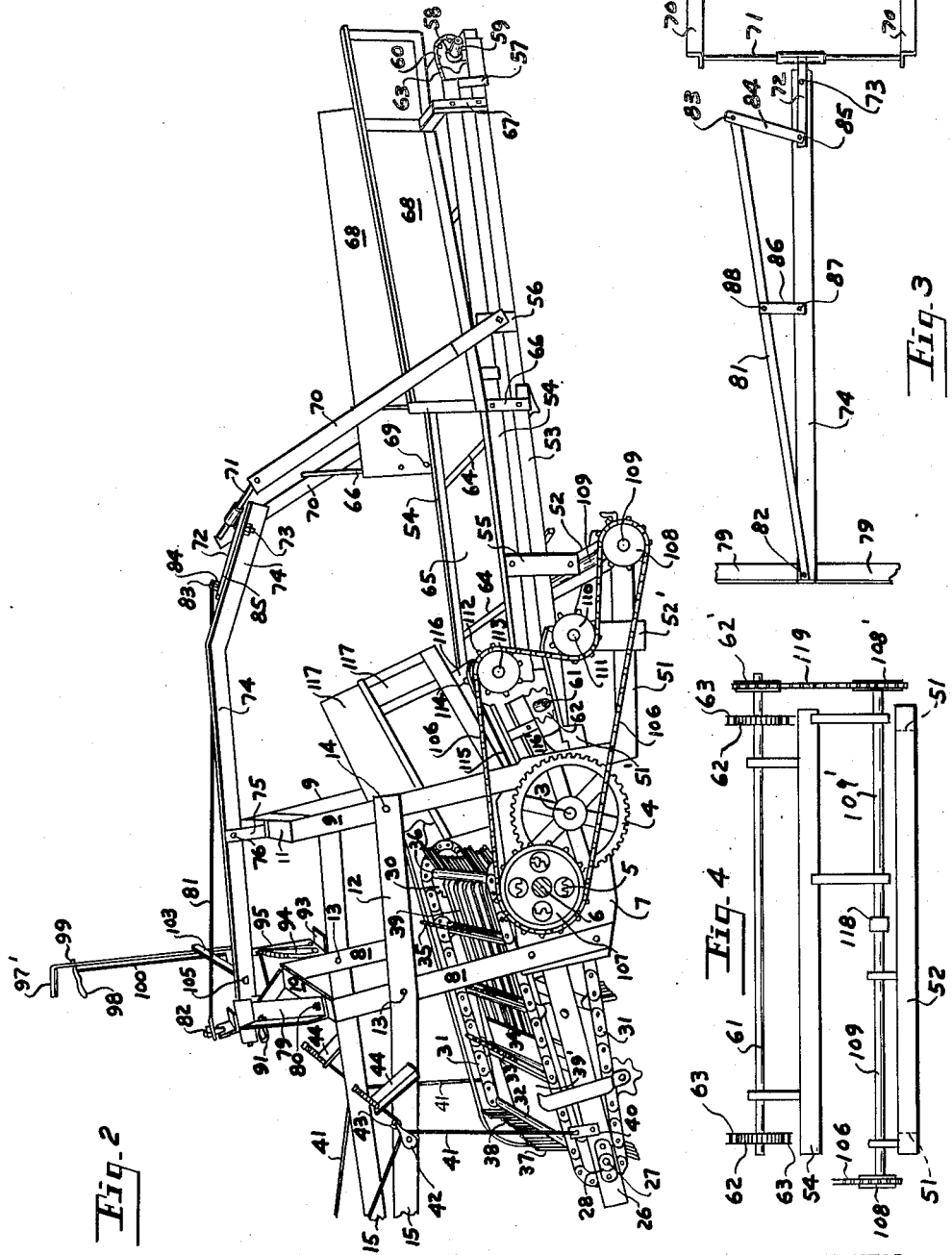

Patented July 7, 1953

2,644,291

UNITED STATES PATENT OFFICE 2,644,291

ADJUSTABLE CONVEYER FOR HARVESTER PICKUPS

Bernard Lemanski, Bad Axe, Mich.

Application August 17, 1950, Serial No. 180,072

9 Claims. (Cl. 56—351)

This invention relates to a harvesting machine and more particularly to a harvesting machine on wheels which is adapted to pick up cut grain or other harvested products and transfer the same to a wagon or other storage container.

It is the object of the present invention to provide a harvesting device on wheels which includes a pick-up and conveying frame in conjunction with one or more other conveyors for transporting the cut grain from the ground over the various conveyors and upwardly into a wagon or other storage medium.

It is a further object of this invention to provide a pick up conveyor which is pivotally mounted upon the machine frame and which can be raised and lowered manually at its outer end to the desired extent.

It is a further object of this invention to provide a power transmission between the supporting shaft of one of the wheels of the device and the pick-up conveyor mechanism whereby the latter is operated as the harvester device is moved over the ground.

It is a further object of this invention to provide a second elongated loading conveyor which is suitably suspended from the frame of the device and which may be angularly raised and lowered with respect to said frame, and which may also be turned at an angle to said first conveyor.

These and other objects will be seen from the following specification and claims in conjunction with the appended drawings in which—

Fig. 2 is a perspective view thereof from one side and with the wheels and other parts removed.

Fig. 3 is a fragmentary plan view of a portion of the device; and

Fig. 4 illustrates the driving connection to one of the conveyors.

Figure 1:
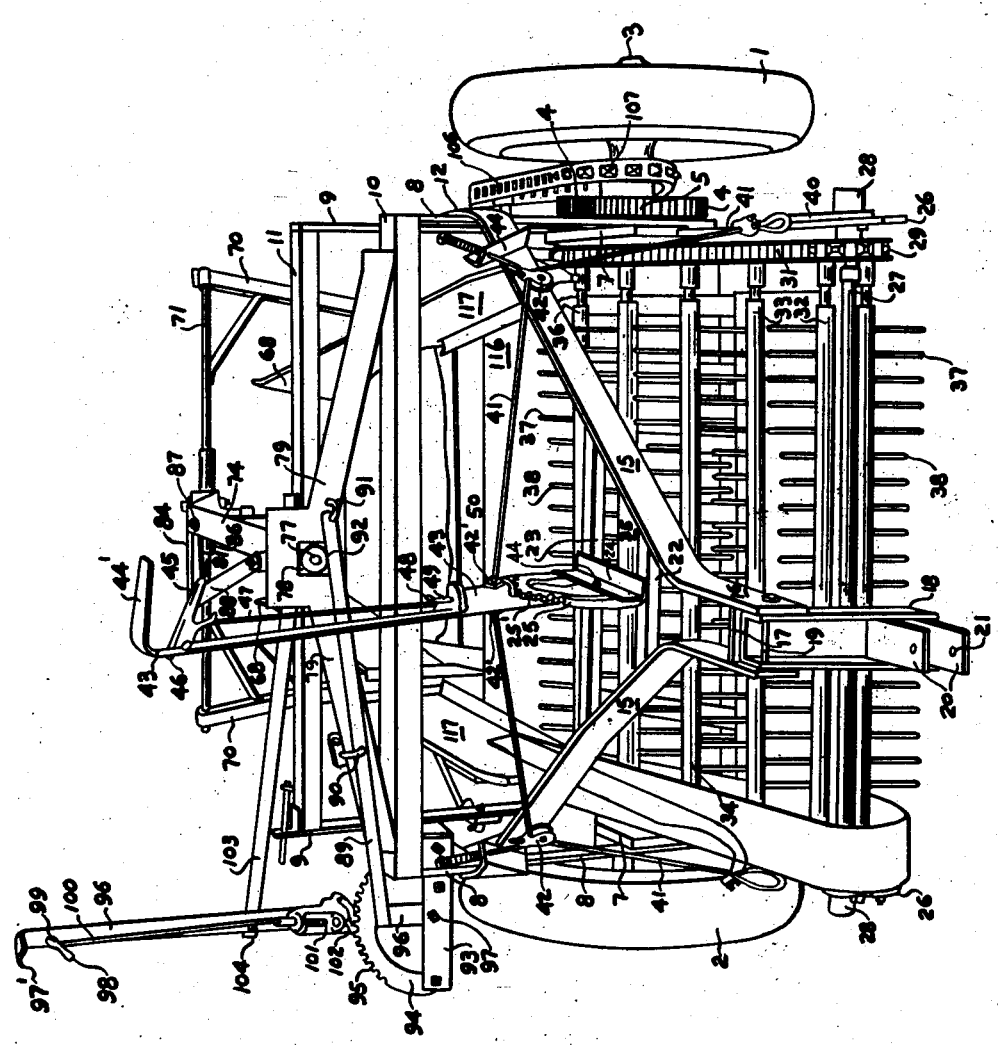
Fig. 1 is a perspective view of the machine from the front end thereof.

It will be understood that the above drawings illustrate merely a preferred embodiment of the invention and that other embodiments are contemplated within the scope of the claims hereafter set out.

Referring to the drawings the harvesting machine includes a pair of supporting wheels 1 and 2 attached to the frame hereafter described. One of the wheels includes a rotatable shaft 3 upon which it is secured with said shaft being suitably supported and journaled upon the frame element 7. A gear 4 is secured upon the shaft 3 and is in mesh with a pinion 5 mounted upon a second supporting shaft 6 which shaft is also mounted and journaled upon the frame element 7 as shown in the drawings.

The frame for the harvesting machine includes a pair of upright frame elements 8 and a longitudinally spaced upright pair of frame elements 9 having respectively interconnecting their upper ends the cross pieces 10 and 11. Horizontal bars 12 which form a part of the drawing tongue of the device are positioned upon opposite sides of the frame elements 8 and 9 in substantially parallel relation and are joined to elements 8 and 9 by the connections 13 and 14.

The forward ends of the tongue converge towards each other at 15 and terminate in the closely spaced forward projections 16 which are joined together by the spacer 17 as shown in Fig. 1. Rectangularly shaped draw bar 18 is positioned between the forward ends 16 of the tongue 12—15 and pivotally connected thereto by the bolt 19 at one end thereof. Parallel spaced plates 20 with attachment openings 21 are secured to the draw bar 18 providing a means of attachment of the harvesting device to a tractor or other pulling mechanism.

Spaced cross supports 22 and 23 span and interconnect the converging portions 15 of the tongue and an angle plate 24 is centrally secured upon said cross supports. The upright frame 25 of circular shape has a circular gear segment 25' thereon for cooperation with a control lever in a manner hereafter described.

As shown in Figs. 1 and 2 there is provided a grain or vegetable pick-up conveyor which projects forwardly of the present harvesting device and which includes a pair of parallel spaced supporting plates 26 whose inner ends are pivotally mounted to the interior walls of the side frame 7 to permit raising and lowering of the outer ends of said frame elements. Bearing supports 28 project laterally from the outer ends of the members 26 and the shaft 27 interconnects the outer ends of the supporting plates 26 and is journaled within the bearing supports 28.

Sprocket gear 29 is secured upon the shaft 27 within the support 26 and is in engagement with the continuous sprocket chain 31. Similarly there is also a second sprocket gear 29 at the opposite end of the shaft 27 positioned within the other side support 26 and which is also engageable with a second continuous sprocket chain 31. The sprocket gears 30 engage the upper ends of the sprocket chains 31 and are suitably journaled upon the side frame element 7 whereby both of the sprocket chains move in unison within and between the conveyor side supports 26. The upper sprocket gears 30 are mounted upon the rotatable shaft 6 which is driven by the pinion 5 thereon and which is in turn in mesh with the gear 4 on the rotatable wheel supporting shaft 3. Consequently rotation of the wheel 1 as the device is drawn along over the ground causes rotation of the sprocket chains 31 which are interconnected by the shaft 27 and the lower sprocket gears 29 to thereby effect a continuous movement of said sprocket chains during movement of the harvesting vehicle.

A plurality of parallel longitudinally spaced cross rods, such as the cross rods 32, 33, 34, 35 and 36, are interposed between the sprocket chains 31 with their ends joined thereto for movement in unison. While in Fig. 2 there are shown only the five cross rods, it is contemplated that these cross rods should be spaced throughout the entire length of the sprocket chains. A row of longitudinally spaced fingers 37 of predetermined length and certain additional fingers of shorter length 38 are arranged in a longitudinal row in spaced relation upon each of the cross rods 32, 33, 34, 35 and 36, for illustration, and are upon a slight angular inclination as shown in Fig. 2. The said sprocket chains 31 and the cross rods with their fingers are continuously movable as the wheels rotate to thereby provide a grain or vegetable pick-up and conveying device. It is understood that the fingers 37 and 38 will maintain the same inclination upon their respective cross rods throughout their movement upon the upper side of the conveyor and will begin to turn in a clockwise direction only as they round the ends thereof.

A plurality of inclined parallel spaced stationary staves 39 are arranged and supported within the conveyor mechanism and there is mounted thereon a suitable cover 39' a portion of which is shown in Fig. 2 to prevent particles of the harvested product from dropping through the conveyor.

Plate brackets 40 are secured towards the outer ends of the conveyor side supports 26 and the lower ends of the cable 41 extend over the pulleys 42 and are joined to said brackets with the upper ends of said cable being joined to the control arm 43 as at points 42'.

Control arm 43 with handle 44' is pivotally mounted at 44 to the angle plate 24 upon the tongue elements 15. The control arm 43 extends upwardly and has a release arm 45 pivotally joined thereto at 46.

The control bar 47 depends from release arm 45 and has a hook 48 at its lower end which is joined to a reciprocal shaft 49 whose lower end is joined to and carries the finger 50 adapted for selective engagement within the gear teeth 25' of the frame element 25. Upward pivotal movement of the release arm 45 disconnects the finger 50 from said gear teeth whereby the control arm 43 through its handle 44' may be pivoted about the point 44 to thereby draw up upon the cable 41 to thereby effect an upward pivotal movement of the pick-up conveyor and its side supports 26, inasmuch as the outer ends of said cable are joined to the outer ends of the conveyor side supports 26. Thus by manipulating the control arm 43 the outer end of the pick-up conveyor may be adjusted vertically with respect to the ground to the desired elevation.

Referring to Fig. 2 the harvesting machine frame elements 9 include the lower rearwardly extending frame elements 51 which are joined at their rearward ends by the cross beam 52.

A second elongated loading conveyor is provided upon the rear end of the device, which includes the parallel spaced frame elements 53 and 54 which are laterally spaced from a second pair of frame elements 53 and 54 defining the supporting side walls of said secondary conveyor. The side walls are reinforced by the interconnecting upright bars 55, 56 and 57 and suitable bearings 58 are supported upon the outer end of said conveyor upon opposite sides thereof for journaling and supporting the transverse shaft 59.

Similar spaced bearings are arranged at the opposite inner ends of the conveyor frame elements 53—54 for supporting the rotatable conveyor shaft 61 there being spaced sprocket gears 60 secured adjacent opposite ends of the shaft 59 and similarly spaced sprocket gears 62 adjacent the opposite ends of the shaft 61.

Suitable sprocket chains 63 interconnect the sprocket gears 60 and 62 within and upon opposite sides of the frame elements 53—54, and a plurality of cross bars 64 are longitudinally spaced around the two sprocket chains 63 with their opposite ends respectively joined thereto for movement in unison with said chains. A suitable endless cover of canvas or other material 65 extends around the shafts 59 and 61 and is secured to the cross bars 64 which stiffen the same, to thereby provide a suitable loading conveyor which operates in conjunction with the grain or vegetable pick-up conveyor first described.

The upright brackets 66 and 67 are secured upon opposite sides of the conveyor frames 53 and 54 in spaced relation and arranged towards the upper delivery end thereof upon which are positioned two converging elongated guide plates 68 between which the harvested material is carried by the conveyor element 65, said plates being secured as at 69 to said brackets.

Parallel spaced forwardly inclined side frames 70 are pivotally joined at their lower ends to the central cross plates 56 of the loading conveyor, and their upper ends are interconnected by the cross bar 71. The central portion of cross bar 71 is secured to the end of lever 72, the latter being pivotally mounted at 73 to the central supporting beam 74. Said beam is centrally supported upon and pivoted at 76 to the swivel 75 which is arranged centrally upon cross frame element 11. The other end of the beam 74 terminates in the cylindrical portion 77 which is positioned and retained within the slot 78 arranged at the upper ends of the upwardly inclined supporting legs 79, the lower ends of which are suitably anchored as at 80 to the horizontal cross piece 10 of frame element 8.

The reinforcing stay bar 81 is joined at 82 to the upper portion of the inclined frame elements 79 whereas the opposite end is pivotally joined at 83 to the supporting lever 84, the opposite end of which is pivotally connected at the outer end 85 of lever 72. There is also an intermediate lever 86 which is pivoted at 87 at one end to the beam 74 with its other end pivotally connected at 88 to the stay bar 81.

The link 89 is mounted and supported upon the frame elements 79 by the bracket elements 90 and 91 whereby an intermediate portion of said link supports the outer end 77 of the beam 74 at point 92 maintaining the same within the slot 78 in the frame elements 79. However the link 89 may be removed to thereby permit the end 77 of the beam 74 to be dropped or drawn downwardly so as to extend below the upwardly inclined frame elements 79.

The lateral angle iron 93 is secured to and projects from the frame element 8 as shown in Fig. 1 and has secured thereto the arcuate gear segment 94 with gear teeth 95. The control arm 96 is pivotally mounted at 97 at its lower end to the angle iron 93 and the upper end of the arm 96 has an operating handle 97'. The control trigger 98 is pivoted at one end to said arm at 99 and has a depending tie rod 100 whose lower end engages the finger 102 which is adapted for selective registry within the teeth 95 of the gear segment 94, there being a suitable coil spring 101 normally urging said finger downwardly relative to said teeth.

The operating link 103 is pivotally joined at 104 at one end to the lower portion of the control arm 96, and the opposite end of said link is joined at 105 to the end of the beam 74 as shown in Fig. 2. By this construction, once the cylindrical end 77 is released by downward movement from the retaining slot 78, pivotal movement of the control arm 96 through the link 103 will cause a swivel movement of the beam 74 below the frame element 79 and upon the swivel 75 on frame elements 9—11.

Thus the loading conveyor may be angularly turned with respect to the pick-up conveyor with the extent of the turning regulated by control arm 96.

The sprocket gear 107 is keyed upon the shaft 6 and is interconnected with the sprocket gears 108, 110 and 112 by the sprocket chain 106. Thus rotative motion of wheel 1 turns the shaft 3 and the gear 4 thereon which in turn rotates the gear 5 to effect rotation of the shaft 6 and this shaft drives the sprocket gear 107 and the chain 106 connected therewith to thereby rotate the aforementioned sprocket gears 108, 110 and 112.

The sprocket gear 108 is secured upon the transverse shaft 109 which is supported and journaled upon the rearwardly projecting frame elements 51. A similar sprocket gear 108' is also provided upon an extension shaft 109' journaled and supported upon and under frame elements 53—54. The rotation of the shaft 109 is adapted to effect rotation of said extension shaft through a suitable universal joint 118. Shaft 61 which drives the conveyor belt 65 by means of sprocket chains 63 is itself joined to said extension shaft 109'. Sprocket gear 108' on shaft 109' joins sprocket gear 62' on shaft 61 by a sprocket chain 119 for rotating the same.

The sprocket chain 106 passes under the idler sprocket gear 110 which is journaled upon the shaft 111 supported upon the frame elements 51' and 52' as shown in Fig. 2. The sprocket chain is in driving engagement with the sprocket gear 112 on the transverse rotatable shaft 113 which carries sprocket gear 114 adjacent thereto and a similar sprocket gear, not shown, upon its opposite end. The shaft 113 and the sprocket gears 114 thereon are adapted to effect movement of the intermediate upwardly inclined conveyor belt 116, whose lower end extends adjacent and below the upper end of the pick-up conveyor at the forward end of the machine.

The shaft 113 is journaled at its opposite ends within suitable bearings at the upper ends of the inclined frame 116' which is secured to the frame elements 9 on opposite sides and which is adapted to support said intermediate upwardly inclined conveyor 116. In a conventional manner, not shown in the drawing, there is a similar shaft journaled at the lower end of the conveyor frame 116 which also carries sprocket gears similar to the sprocket gears 114 and which are interconnected therewith by the sprocket chains 115 to thereby drive the conveyor 116.

The upright guide plates 117 are secured in position on the interior edges of the frame elements 9 and are spaced upon opposite sides of the conveyor belt 116 for guiding the cut grain or other material which is transported from the pick-up conveyor to the intermediate conveyor 116 which thence directs the same upon the loading conveyor 65.

By the above described construction rotation of the wheel 1 as it is drawn along the ground causes the movement of the three conveyors described above.

By employing the universal joint 118 between shafts 109 and 109' as shown in Fig. 4, it is apparent from the drawings that the shaft 109 is stationary though rotatable, whereas shaft 109' is rotatable with respect thereto inasmuch as said shaft is journaled and supported below and upon the under side of frame elements 53—54. This means that the conveyor belt 65 will receive power regardless of the angular positioning of said conveyor with respect to the main body frame of the harvesting machine.

While the present machine is particularly adapted for the harvesting of beans, it may be adapted for other products as well.

The present harvesting machine has a frame which supports a first conveyor within the supporting plates 26, a second rearwardly extending delivery conveyor within the frame elements 53—54 also mounted upon the first frame, and in addition a third upwardly inclined conveyor 116, which is also positioned within the first frame and arranged intermediate the first and second frames. The lower end of the third conveyor is below and adjacent the upper or inner end of the first conveyor. The upper end of the third conveyor is arranged adjacent and above the corresponding inner end of the second conveyor.

The wheel 1 drives the shaft 3 and gear 4 which drives sprocket shaft 6 operating the first pick-up conveyor. Sprocket chain 106 interconnects sprocket shaft 6 and shaft 109, Fig. 2. Fig. 4 illustrates the sprocket chain 119 interconnecting shafts 109 and 61. Shaft 61 and the sprockets 63 thereon operate the second rearwardly extending loading conveyor 65. The sprocket chain 106 is also connected to sprocket 112 on shaft 113 for operating the third intermediate conveyor 116.

Thus on movement of the machine all three conveyors will be operated simultaneously for picking-up the grain in the first conveyor, transmitting the same to the third conveyor which in turn transmits the grain to the second conveyor which is adapted to unload said grain in any suitable storage mechanism.

The second conveyor 65 is supported by the inverted U-shaped frame 70 which is mounted upon the rear end of the beam 74 shown in Fig. 2. Said beam intermediate its ends is pivoted at 76 upon the swivel 75. The front end of said beam is joined by a link 103 to an operating lever 97 whereby the beam 74 may be swung to the right or the left upon the swivel 75 in turn swivelling the second conveyor to the right or left.

Having described my invention reference should now be had to the claims which follow for determining the scope thereof.

I claim:

1. In a harvesting machine, a frame, supporting wheels thereon, a second grain pick-up frame joined at one end to said first frame and projected forwardly and angularly downward therefrom, a conveyor upon said second frame, a second elongated conveyor mounted upon said first frame and projecting rearwardly thereof, a third upwardly inclined conveyor upon and within said first frame intermediate said conveyors with its lower end positioned adjacent the upper end of said first conveyor and with its upper end positioned above and adjacent the corresponding end of said second conveyor, an inverted U shaped support joined at its lower ends to opposite sides of said second conveyor and angularly inclined forwardly thereof, and a longitudinally arranged supporting beam pivotally mounted intermediate its ends upon said first frame, with its rear end joined centrally to said U shaped support and with its front end adjustably anchored within said first frame.

2. In a harvesting machine, a frame, supporting wheels thereon, a second grain pick-up frame joined at one end to said first frame and projected forwardly and angularly downward therefrom, a conveyor upon said second frame, a second elongated conveyor mounted upon said first frame and projecting rearwardly thereof a third upwardly inclined conveyor upon and within said first frame intermediate said conveyors with its lower end positioned adjacent the upper end of said first conveyor and with its upper end positioned above and adjacent the corresponding end of said second conveyor, an inverted U shaped support joined at its lower ends to opposite sides of said second conveyor and angularly inclined forwardly thereof, a swivel on said first frame, and a longitudinally arranged supporting beam pivotally mounted intermediate its ends upon said swivel with its rear end centrally joined to said U shaped support and with its front end adjustably anchored within said first frame.

3. In a harvesting machine, a frame, supporting wheels thereon, a second grain pick-up frame joined at one end to said first frame and projected forwardly and angularly downward therefrom, a conveyor upon said second frame, a second elongated conveyor mounted upon said first frame and projecting rearwardly thereof, a third upwardly inclined conveyor upon and within said first frame intermediate said conveyors with its lower end positioned adjacent the upper end of said first conveyor and with its upper end positioned above and adjacent the corresponding end of said second conveyor, and inverted U shaped support joined at its lower ends to opposite sides of said second conveyor and angularly inclined forwardly thereof, a swivel on said first frame, a longitudinally arranged supporting beam pivotally mounted intermediate its ends upon said swivel with its rear end centrally joined to said U shaped support and with its front end adjustably anchored within said first frame, an upright control arm pivotally mounted upon said first frame, and a link interconnecting said arm and the front end of said beam adapted on tilting movement of said control arm to swing said beam horizontally upon its swivel.

4. In a harvesting machine, a frame, supporting wheels thereon, a second grain pick-up frame joined at one end to said first frame and projected forwardly and angularly downward therefrom, a conveyor upon said second frame, a second elongated conveyor mounted upon said first frame and projecting rearwardly thereof, a third upwardly inclined conveyor upon and within said first frame intermediate said conveyors with its lower end positioned adjacent the upper end of said first conveyor and with its upper end positioned above and adjacent the corresponding end of said second conveyor, an inverted U shaped support joined at its lower ends to opposite sides of said second conveyor and angularly inclined forwardly thereof, a longitudinally arranged supporting beam pivotally mounted intermediate its ends upon said first frame, with its rear end joined centrally to said U shaped support and with its front end adjustably anchored within said first frame, and upright rearwardly converging grain guide plates mounted upon the rear end of said second conveyor.

5. In a harvesting machine, a frame, supporting wheels thereon, a second grain pick-up frame joined at one end to said first frame and projected forwardly and angularly downward therefrom, a conveyor upon said second frame, a second elongated conveyor mounted upon said first frame and projecting rearwardly thereof, an inverted U shaped support joined at its lower ends to opposite sides of said second conveyor and angularly inclined forwardly thereof, a longitudinally arranged supporting beam pivotally mounted intermediate its ends upon said first frame, with its rear end joined centrally to said U shaped support and with its front end adjustably anchored within said first frame, an upwardly inclined third conveyor upon and within said first frame intermediate said conveyors with its lower end positioned below the upper end of said first conveyor and with its upper end extending over the forward end of said second conveyor, and sprocket chain means interconnecting said first and third conveyors.

6. In a harvesting machine, a frame, supporting wheels thereon, a second grain pick-up frame joined at one end to said first frame and projected forwardly and angularly downward therefrom, a conveyor upon said second frame, a second elongated conveyor mounted upon said first frame and projecting rearwardly thereof, a third upwardly inclined conveyor upon and within said first frame intermediate said conveyors, with its lower end positioned adjacent the upper end of said first conveyor, and with its upper end positioned above and adjacent the corresponding end of said second conveyor, an inverted U-shaped support joined at its lower ends to opposite sides of said second conveyor and angularly inclined forwardly thereof, a swivel on said first frame, a longitudinally arranged supporting beam pivotally mounted intermediate its ends upon said swivel with its rear end centrally joined to said U-shaped support and with its front end adjustably anchored within said first frame, an upright control arm pivotally mounted upon said first frame, a link interconnecting said arm and the front end of said beam adapted on tilting movement of said control arm to swing said beam horizontally upon its swivel, a pair of transversely arranged upwardly converging guide legs on said first frame interconnected at their inner ends with an undercut upright notch formed at their apex in substantial longitudinal alignment with said swivel, the front end of said beam positioned within said notch, and a link removably secured to and spanning said legs and bearing against said beam maintaining its front end within said notch.

7. In a harvesting machine, a frame, supporting wheels thereon, a second grain pick-up frame joined at one end to said first frame and projected forwardly and angularly downward therefrom, a conveyor upon said second frame, a second elongated conveyor mounted upon said first frame and projecting rearwardly thereof, a third upwardly inclined conveyor upon and within said first frame intermediate said conveyors, with its lower end positioned adjacent the upper end of said first conveyor, and with its upper end positioned above and adjacent the corresponding end of said second conveyor, and inverted U-shaped support joined at its lower ends to opposite sides of said second conveyor and angularly inclined forwardly thereof, a swivel on said first frame, a longitudinally arranged supporting beam pivotally mounted intermediate its ends upon said swivel with its rear end centrally joined to said U-shaped support and with its front end adjustably anchored within said first frame, an upright control arm pivotally mounted upon said first frame, a link interconnecting said arm and the front end of said beam adapted on tilting movement of said control arm to swing said beam horizontally upon its swivel, a pair of transversely arranged upwardly converging guide legs on said first frame interconnected at their inner ends with an undercut upright notch formed at their apex in substantial longitudinal alignment with said swivel, the front end of said beam positioned within said notch, a link removably secured to and spanning said legs and bearing against said beam maintaining its front end within said notch, said beam when released from said notch being guidably retained against the undersurfaces of said legs whereby horizontal movements of said beam will also effect vertical adjustments thereof for raising and lowering said second conveyor, and means for securing said control arm in adjusted position.

8. In a harvesting machine, a frame with supporting wheels thereon, an elongated conveyor mounted at one end upon said frame and projecting rearwardly thereof, an inverted U-shaped support joined at its lower ends to opposite sides of said conveyor and angularly inclined upwardly and forwardly thereof, a swivel on said frame, a longitudinally arranged supporting beam pivotally mounted intermediate its ends upon said swivel for universal pivotal movements with its rear end joined to its U-shaped support, a pair of transversely arranged upwardly converging guide legs on said frame interconnected at their ends with an undercut upright notch formed at their apex in substantial longitudinal alignment with said swivel, the front end of said beam being positioned within said notch, a link removably secured to and spanning said legs bearing against said beam maintaining its front end within said notch, an upright control arm pivotally mounted upon said frame, and a second link interconnecting said arm and the front end of said beam adapted on removal of said first link on tilting movement of said control arm to swing said beam horizontally upon its swivel.

9. In a harvesting machine, a frame with supporting wheels thereon, an elongated conveyor mounted at one end upon said frame and projecting rearwardly thereof, an inverted U-shaped support joined at its lower ends to opposite sides of said conveyor and angularly inclined upwardly and forwardly thereof, a swivel on said frame, a longitudinally arranged supporting beam pivotally mounted intermediate its ends upon said swivel for universal pivotal movements with its rear end joined to its U-shaped support, a pair of transversely arranged upwardly converging guide legs on said frame interconnected at their ends with an undercut upright notch formed at their apex in substantial longitudinal alignment with said swivel, the front end of said beam being positioned within said notch, a link removably secured to and spanning said legs bearing against said beam maintaining its front end within said notch, an upright control arm pivotally mounted upon said frame, a second link interconnecting said arm and the front end of said beam adapted on removal of said first link on tilting movement of said control arm to swing said beam horizontally upon its swivel, said beam being guidably retained against the undersurfaces of said legs whereby horizontal movements of said beam will also effect vertical adjustments thereof for raising and lowering said second conveyor, and means for securing said control arm in adjusted position.

BERNARD LEMANSKI.

References Cited in the file of this patent

UNITED STATES PATENTS

| Number | Name | Date |
|---|---|---|
| 840,351 | Lormis | Jan. 1, 1907 |
| 923,868 | Lyback | June 8, 1909 |
| 965,115 | Moore | July 19, 1910 |
| 1,037,793 | Mulloy | Sept. 3, 1912 |
| 1,119,422 | Gould | Dec. 1, 1914 |
| 1,216,350 | Nelson | Feb. 20, 1917 |
| 1,219,489 | Rose | Mar. 20, 1917 |
| 1,261,702 | Christensen | Apr. 8, 1918 |
| 1,306,597 | Krogen | June 10, 1919 |
| 1,425,791 | Oak | Aug. 15, 1922 |
| 1,617,490 | Knox | Feb. 15, 1927 |
| 1,936,603 | Larson | Nov. 28, 1933 |